UNITED STATES PATENT OFFICE.

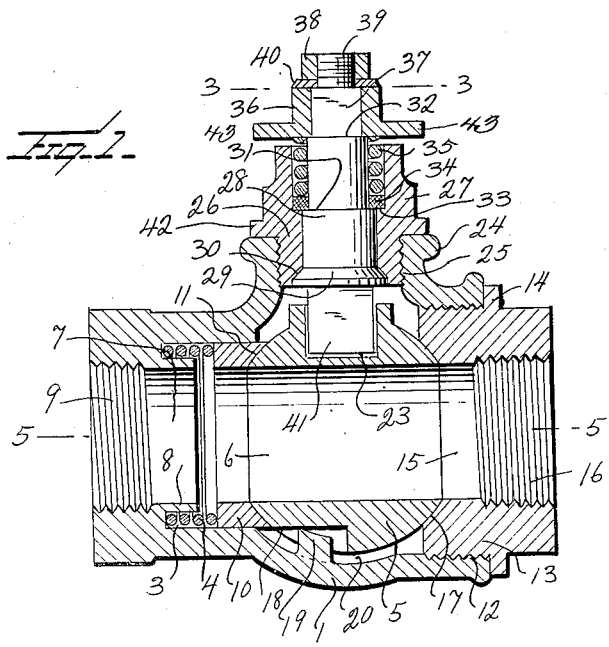
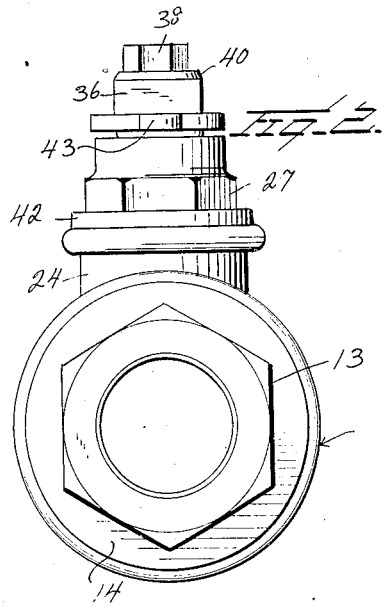
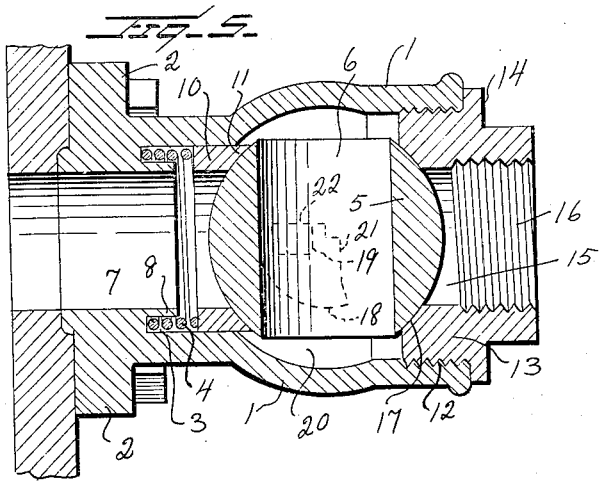
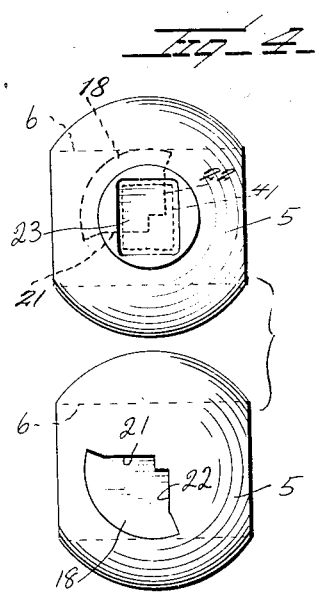
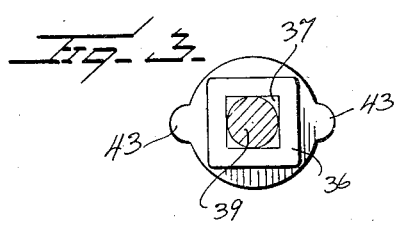

HENRY H. RIGGIN, OF ALTOONA, PENNSYLVANIA, ASSIGNOR TO ALBERT F. SHOMBERG, OF ALTOONA, PENNSYLVANIA.

VALVE OR BLOW-OFF COCK.

1,331,025.  Specification of Letters Patent.  Patented Feb. 17, 1920.

Application filed April 12, 1919. Serial No. 289,647.

*To all whom it may concern:*

Be it known that I, HENRY H. RIGGIN, a citizen of the United States, residing at Altoona, in the county of Blair and State of Pennsylvania, have invented certain new and useful Improvements in Valves or Blow-Off Cocks, of which the following is a specification, reference being had to the accompanying drawings.

This invention relates to the art of valves commonly known as blow off cocks, particularly adapted for use on the bottom part of boilers.

It is the aim of the invention to provide an improved valve or blow off cock for application as aforesaid, for removing the water, mud, and scales, in fact sediment or refuse from the interior of the boiler.

A further object of the invention is to provide a valve of this particular kind, to accommodate this service in connection with boilers and the like, and to provide a valve of such a construction as to enable this service to be performed efficiently.

A further object of the invention is to provide a valve of this kind, which is very simple in construction, that is consistent with the practicability desired, to enable the service to be properly rendered.

A further object of the invention is to provide a valve which is simple and economical in operation, and one which will permit of the passage of broken parts of stay bolts, without injury to the valve seats.

A further object of the invention is to provide an improved straight way valve, which when in open position, the port through the valve will register with the opposite ports of the valve casing, and provide an unobstructed cylindrical passage therethrough, enabling a free flow of the fluid, and also permitting of the free passage of the broken parts of stay bolts.

A further object of the invention is to provide a valve of this kind, in which the parts may be easily renewed, certain of the parts being interchangeable, and it is to be further noted that such parts may be kept in stock, in order to make quick repairs, it being obvious that the casing of the valve will last substantially indefinitely, which has been found to be quite a saving in the cost of upkeep or maintenance.

A further object of the invention is to provide a valve of this kind, in which the valve proper is so connected to the stem of the valve, that when the valve is in a closed position, it has sufficient play on both sides of the valve stem, so that the valve proper (which is in the form of a ball or spherical member) may automatically adjust itself to its diametrically opposite seats, there being means coöperating between the valve stem and the bonnet of the valve stem to provide any binding or friction on the stem of the valve relatively to the valve proper. The valve seat on the stem of the valve acts to prevent any steam or water from entering or passing through the bonnet, there being means between the yieldable means and a shoulder of the bonnet, to prevent leakage.

A further object of the invention is to provide a valve, including a valve proper, which is capable of a limited quarter turn, to open or close the valve, there being means on the top of the valve stem for indicating the open or closed position of the valve.

A further object of the invention is to provide a valve or blow off cock of this kind, which may be easily repaired, or the parts removed, without removing the valve from the boiler.

A further object of the invention is to provide a valve or blow off cock, of such construction that will meet all the requirements in service, and the cost of upkeep.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a vertical sectional view through the valve or blow off cock constructed in accordance with the invention.

Fig. 2 is an end view of the same.

Fig. 3 is a sectional view on line 3—3 of Fig. 1.

Fig. 4 illustrates bottom and top plan views of the spherical or ball valve proper, illustrating the details of construction.

Fig. 5 is a horizontal sectional view on line 5—5 of Fig. 1. In this figure the valve casing is illustrated as having a flange, whereby the valve casing is particularly adapted for connection with the fire box.

Referring more especially to the drawings, 1 designates the casing of the valve or blow off cock, and which may be connected to the bottom of boilers of various types, and which may also be connected to a fire box, particularly if the valve casing is provided with a flange 2 at one end, such as indicated in Fig. 5. This casing may be any suitable shape or configuration, preferably substantially T-shaped as illustrated, and it is to be noted that one end of the casing is larger than its opposite end. The smaller end, on its interior is provided with an annular channel 3, constituting a pocket for the reception of a coil spring 4. The intermediate part of the valve casing is chambered out for the reception of the spherical valve member 5, which is provided with a transverse longitudinal passage 6. The intermediate chambered out part of the valve casing communicatively connects with the passage 7 through the smaller end portion of the valve casing, and it is to be observed that the flange 8 (which forms one wall of the channel 3) acts to retain the coil spring 4 in position. The outer end of the passage 7 is provided with threads 9. The passage 7 has one end larger than its other end and is designed for the reception of the ring 10, which is engaged by the coil spring 4. This ring has a spherical bearing 11 constituting a valve seat for the spherical valve 5.

The larger end portion of the valve casing has its interior surface provided with threads 12 to be engaged by the threads of the outer valve bonnet or ring 13. This valve bonnet or ring is provided with an annular flange 14, which contacts with the end surface of the larger end of the valve casing. The outer portion of the passage 15 through the valve bonnet or ring is threaded as at 16. The threads 9 and 16 are designed expressly for the purpose of connecting the valve casing to the bottom of the boiler, and to afford suitable conduit connections to the casing, whereby when the valve is open, the fluid and the sediment may have a free passage, and it is to be also noted that broken parts of stay bolts may pass out, without injury to the valve seats. One end of the outer valve bonnet at a point adjoining its passage 15 is provided with a spherical bearing 17, constituting a valve seat for the opposite end of the spherical valve 5. It is to be noted that the valve 5 engages its seat, without contacting in any way with the valve casing. The coil spring 4 yieldingly urging on the ring 10, acts to urge the valve seat 11 toward and in contact with the valve 5. This urging action is also transmitted so as to hold the opposite end of the valve 5 in contact with the seat 17. It is to be noted that the under part of the spherical valve is provided with a substantially segment shaped cutaway portion 18, of a shape shown in the bottom plan view of the spherical valve. A lug 19 is formed on the surface of the chamber 20 of the valve casing. This lug is positioned at a point offset from the center of the spherical valve, and extends into the cutaway portion or recess 18 of the spherical valve, and constitutes means for engagement with either of the abutment walls 21 and 22, in order to limit the valve to an open or closed position. It is apparent that the passage 6 through the spherical valve, and the passages 7 and 15 and the opening through the ring 10 are substantially of the same diameter, thereby affording an unobstructed passage from the boiler through the valve. By means of this passage, it is obvious that the sediment and the broken parts of stay bolts may be easily and quickly drawn off.

The spherical valve at a point diametrically opposite the cutaway portion 18 is provided with a cavity 23. The valve casing has a lateral extension 24, and the interior surface of this extension is supplied with threads 25, which are engaged by the threads of the extension 26 of the valve bonnet 27. A valve stem 28 engages through the valve bonnet 27, and is provided with a beveled flange 29, which engages a similarly constructed seat 30 of the extension 26 of the valve bonnet 27. One end portion of the valve stem is provided with a pair of shoulders 31 and 32. A shoulder 33 is formed on the interior of the valve bonnet, and this shoulder, as will be observed coincides with the shoulder 31, and both shoulders are engaged by a composition washer 34, there being a coil spring 35 interposed between the composition washer 34 and a cap nut 36, thereby holding the composition washer in position, and closing and packing the joint between the valve stem and the interior of the valve bonnet 27. This cap nut 36 is mounted on a rectangular extension 37 of the valve stem, there being a nut 38 threaded on the second extension 39 of the stem, thereby holding the cap nut in contact with the shoulder 32. A suitable washer 40 is interposed between the nut 38 and the cap nut. The valve stem inwardly of the flange 29 has a rectangular extension 41, which engages the cavity 23 of the spherical valve, and since this cavity 23 is slightly longer one way than the opposite direction, so that the spherical valve is capable of slight play, whereby the valve may automatically adjust or accommodate itself to the diametrically opposite seats 11 and 17, that is when the spherical valve is in a closed position, thereby insuring against leakage.

The valve bonnet 27 has an annular portion 42 overlying the end face of the extension 24. It is to be seen that the cap nut is provided with diametrically opposite lugs or protrusions 43, and it is to be observed that when these protrusions 43 extend in a direction in parallelism with the center of the passage through the valve casing extending into the direction of the boiler, the valve is open, whereby its passage communicatively registers with the passages 7 and 15. When these protrusions extend at right angles to the valve casing, it is obvious that the valve is closed, in fact its passage 6 will then be disposed at right angles to the passages 7 and 15.

The invention having been set forth, what is claimed as new and useful is:

1. The combination with a valve casing provided with openings at its opposite ends and a valve seat removably fixed in one end of said casing, of a yieldingly urging valve seat at the opposite end, a spherical valve member intermediate the two seats and provided with a passage adapted to register with the opposite openings, and means for opening and closing the valve member, a loose connection between said means and the valve member to avoid frictional binding between the means and the member, and whereby the valve member may automatically accommodate itself to the opposite seats, and means for limiting the valve member in its open or closed positions.

2. The combination with a valve casing provided with openings at its opposite ends and a valve seat removably fixed in one end of said casing, of a yieldingly urging valve seat at the opposite end, a spherical valve member intermediate the two seats and provided with a passage adapted to register with the opposite openings, said casing having a valve bonnet, a valve stem mounted in said bonnet, a loose connection between the stem and the valve member to permit of the movement of the valve member at right angles to the stem whereby the valve member may accommodate itself to the opposite seats, means on the outer end of the stem, means between the last mentioned means and a part of the bonnet for urging the stem to prevent frictional binding between the valve engaging end of the stem and the valve, to prevent friction between the end of the stem and the valve.

3. The combination with a valve casing provided with openings at its opposite ends and a valve seat removably fixed in one end of said casing, of a yieldingly urging valve seat at the opposite end, a spherical valve member intermediate the two seats and provided with a passage adapted to register with the opposite openings, said casing having a valve bonnet, a valve stem mounted in said bonnet, a loose connection between the stem and the valve member to permit of the movement of the valve member at right angles to the stem whereby the valve member may accommodate itself to the opposite seats, means on the outer end of the stem, means between the last mentioned means and a part of the bonnet for urging the stem to prevent frictional binding between the valve engaging end of the stem and the valve, to prevent friction between the end of the stem and the valve, and means for limiting the valve member in its open or closed positions.

4. The combination with a valve casing having openings at its opposite ends and provided with a fixed valve seat in one end, a yieldingly urging valve seat at the opposite end of the casing, a spherical valve engaging between the seats, a valve bonnet fixed into the casing at right angles to the seats, a valve stem mounted in the bonnet, said stem and the bonnet having interengaging shoulders to limit the stem in its outward movement, said stem and the bonnet having adjoining shoulders provided with a washer engaging said adjoining shoulders, a member on the outer end of the stem, the valve member having a depression or cavity to receive the inner end of the stem, and yieldingly urging means between the member and the washer causing the interengaging shoulders to contact and operate the stem whereby a loose and non-frictional engagement between the inner end of the stem and the depression may be effected, so that the valve member may accommodate itself to its opposite seats.

5. The combination with a valve casing having openings at its opposite ends and provided with a fixed valve seat in one end, a yieldingly urging valve seat at the opposite end of the casing, a spherical valve engaging between the seats, a valve bonnet fixed into the casing at right angles to the seats, a valve stem mounted in the bonnet, said stem and the bonnet having interengaging shoulders to limit the stem in its outward movement, said stem and the bonnet having adjoining shoulders provided with a washer engaging said adjoining shoulders, a member on the outer end of the stem, the valve member having a rectangular depression or cavity to receive the inner end of the stem, and yieldingly urging means between the member and the washer causing the interengaging shoulders to contact and operate the stem whereby a loose and non-frictional engagement between the inner end of the stem and the depression may be effected, so that the valve member may accommodate itself to its opposite seats, and means for limiting the valve in its open or closed positions.

6. The combination of a valve casing having openings at its opposite ends, one end being provided with a fixed valve seat, of a yieldingly urging valve seat at the opposite end, a spherical valve engaging between said seats and provided with a passage to coöperate with the opposite openings, said valve member having a rectangular cavity, a valve stem having its inner end engaging said cavity, means yieldingly urging said valve stem, whereby its inner end is loosely and non-frictionally engaging said cavity, whereby said valve member may automatically accommodate itself to the opposite seats.

7. The combination of a valve casing having openings at its opposite ends, one end being provided with a fixed valve seat, of a yieldingly urging valve seat at the opposite end, a spherical valve engaging between said seats and provided with a passage to coöperate with the opposite openings, said valve member having a rectangular cavity, a valve stem having its inner end engaging said cavity, means yieldingly urging said valve stem, whereby its inner end is loosely and non-frictionally engaging said cavity, whereby said valve member may automatically accommodate itself to the opposite seats, means for limiting the outwardly urging action of the valve stem, and means for limiting the valve member in its open or closed positions.

8. The combination with a valve casing, provided with openings at its opposite ends and a valve seat removably fixed in one end of said casing, the other end of the casing having an annular channel, a second valve seat mounted in the casing adjacent the channel, a coil spring arranged in the channel and interposed between its end wall and the second valve seat, a spherical valve member intermediate the two valve seats, the lower portion of the spherical valve member having segmental cut-away portions provided with right angle disposed shoulders, means rising upwardly from the interior of the casing and interposed and engaging the cut-away portion and coöperating with the shoulders for limiting the spherical valve member in its open or closed positions, and a valve stem provided with a detachable connection with the valve member for opening and closing the same.

9. The combination with a valve casing provided with openings at its opposite ends, the interior wall of one end having an interior flange spaced from the wall of the casing to provide an annular channel, of a movable valve seat adjacent the channel, a second valve seat removably fixed in the other end of the casing, a spherical valve member interposed between the two seats, a coil spring seated in the channel and retained in position by the flange and coöperating with the first valve seat to urge it in engagement with the spherical valve member, means for limiting the spherical valve member in its open or closed positions, and a stem mounted in the casing detachably engaging the spherical valve member for opening or closing the valve.

In testimony whereof I hereunto affix my signature in the presence of two witnesses.

HENRY H. RIGGIN.

Witnesses:
ALEX WEIR,
GEO. A. VANDREU.